March 21, 1939.  R. LEE  2,151,477
SHAFT COUPLING
Filed Oct. 7, 1938
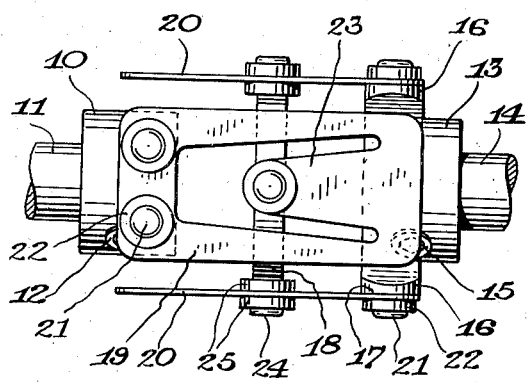
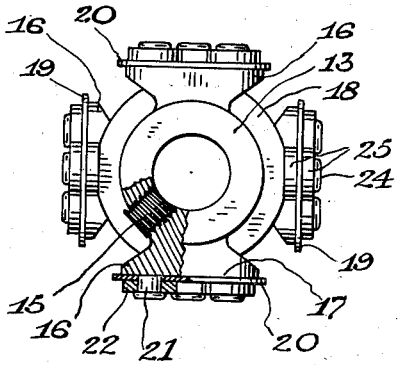
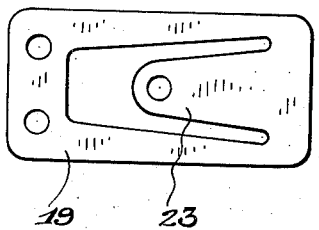
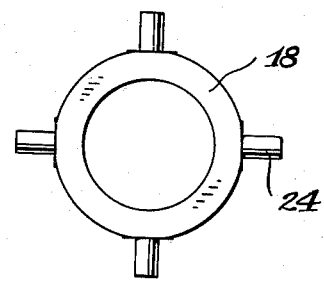
WITNESSES
L. E. Kilian
C. L. Waal
INVENTOR
Royal Lee
By R. S. Caldwell
ATTORNEY Patented Mar. 21, 1939

2,151,477

UNITED STATES PATENT OFFICE 2,151,477

SHAFT COUPLING

Royal Lee, Milwaukee, Wis.

Application October 7, 1938, Serial No. 233,763

10 Claims. (Cl. 64—15)

This invention relates to couplings for connecting two rotatable members which are subject to misalignment, and has for an object to provide for this purpose an improved flexible coupling which is of simple, durable and inexpensive construction, which will compensate for offset or angularity, or both, of the axes of the rotatable members, which will maintain a practically constant angular velocity of the rotatable members, which will minimize relative torsional displacement of the rotatable members, and which will be quiet in operation.

The invention further consists in the several features hereinafter described and claimed.

In the accompanying drawing, illustrating one form of shaft coupling constructed in accordance with the invention, Fig. 1 is a side elevation of the coupling with associated shafts secured thereto;

Fig. 2 is an end elevation of the coupling, parts being broken away and parts being shown in section;

Fig. 3 is a detail view of one of the spring plates or links of the coupling, and Fig. 4 is a detail view of an intermediate member of the coupling.

In the drawing, 10 designates a rotatable coupling member adapted to be secured to a driving shaft 11, as by means of a headless set-screw 12, and 13 designates a second coupling member adapted to be secured to a driven shaft 14, as by means of a headless set-screw 15. The two coupling members are similar or identical in construction, and in some types of couplings these members may be formed of die-castings. Each of the coupling members 10 and 13 is here shown in the form of a hub or collar having diametrically opposite projections 16 presenting flat spring seats 17 approximately parallel to each other and to the axis of rotation, the two spring seats being equally distant from this axis. The two coupling members, which are preferably spaced in an axial direction, cooperate as hereinafter described with an intermediate or connecting member 18 approximately coaxial therewith. The intermediate member is preferably, but not necessarily, disposed between the coupling members, and is here shown to be of annular shape.

A pair of approximately parallel link members 19, preferably in the form of spring plates or leaf springs, are secured to the respective spring seats 17 of the coupling member 10 and have their free ends extending toward the coupling member 13. A pair of similar or identical link members 20 are secured to the respective spring seats of the coupling member 13 and have their free ends extending toward the coupling member 10. The link plates 19 and 20 extend approximately parallel to the axis of rotation, and the two sets of link plates are arranged at right angles to each other, as best seen in Fig. 2. The link plates may also be described as having their planes arranged substantially tangentially. The spring seats of each coupling member are here shown to have rivet pins 21 integrally formed thereon for securing the apertured end portions of the resilient link plates, each pin having a clamping washer 22 at the outer side of the associated plate. Each of the four resilient link plates is interiorly cut away to form spaced side portions and an intervening spring tongue 23 attached at the free end of the plate and extending toward the secured end of the plate, the free ends of the several tongues being apertured and secured to the intermediate or connecting member 18, as by providing the intermediate member with radial rivet pins 24 integrally formed thereon, each pin having clamping washers 25 on opposite sides of the associated link plate. The connections of the spring tongues 23 to the radial rivet pins of the connecting ring are either rigid or pivotal, depending on the nature and degree of shaft misalignment.

In operation, torque is transmitted from the driving member 10 through the resilient link plates 19 to the intermediate member 18, and from the intermediate member through the resilient link plates 20 to the driven member 13. The torque is transmitted edgewise of the link plates, and since there is practically no edgewise yielding of these plates, the driving and driven members are substantially free from relative torsional displacement. If the driving and driven shafts are offset, the link plates will flex radially to accommodate the offset, and this action will also take place if the shafts are at an angle to each other.

For a small angular misalignment of the shafts, the riveted connections between the link plates and the intermediate member 18 may be rigid, but for a larger angular misalignment these riveted connections may also provide pivotal movement. When all the riveted connections for the link plates are of a rigid character, the coupling requires no lubrication.

Each link plate during its flexure has a hinge action, the parallel hinge axes lying in the plane of the plate and extending transversely of the shaft axis. The shape of each link plate provides a relatively great effective spring length in a limited space. Each plate may be described as doubled or reversed on itself, and may form, in effect, a compound link having a spring hinge adjacent to the free end of the plate in addition to the spring hinges adjacent to the riveted connections. In practice, however, the flexure may be more or less distributed along the effective length of the plate. The two link plates which connect each hub member with the intermediate member 18 form therewith a parallelogram linkage, so that the plane of the intermediate member will remain normal to the axes of the two hub members when these axes are offset.

When greater flexibility of the link plates is desired, each of these plates may be formed of two or more plate members of suitable thickness arranged in laminated relation.

The projections 16 on each hub member are placed at one end of the hub member and are symmetrical about an axial plane, thus permitting one or both of the hub members to be individually reversed end for end to vary the effective length of the coupling.

What I claim as new and desire to secure by Letters Patent is:

1. A coupling comprising a rotatable member, two pairs of resilient plates secured to said member, each plate extending approximately parallel to the axis of rotation of said member and each having its plane arranged substantially in a tangential direction, each pair of said plates being arranged on opposite sides of said axis and approximately at right angles to the other pair, and rotatable driving and driven members secured to said respective pairs of plates.

2. A coupling comprising a rotatable member, two pairs of link members hingedly secured to said rotatable member and each extending approximately parallel to the axis of rotation of said rotatable member, the hinging lines of said link members extending transversely of said axis, each pair of link members being arranged on opposite sides of said axis and approximately at right angles to the other pair, and rotatable driving and driven members secured to said respective pairs of link members.

3. A coupling comprising three rotatable members two of which form driving and driven members and the third of which forms an intermediate member, and two pairs of link members having spring hinge connections with said intermediate member and extending approximately parallel to the axis of rotation of said intermediate member, said two pairs of link members having respective spring hinge connections with said driving member and driven member, each pair of link members being arranged on opposite sides of the axis of said intermediate member and approximately at right angles to the other pair, the hinging lines of said link members extending transversely of the axis of rotation of said intermediate member.

4. A coupling comprising three rotatable members two of which form driving and driven members and the third of which forms an intermediate member, and two pairs of link members having hinge connections with said intermediate member and extending approximately parallel to the axis of rotation of said intermediate member, said two pairs of link members having respective hinge connections with said driving and driven member, each pair of link members being arranged on opposite sides of the axis of rotation of said intermediate member and approximately at right angles to the other pair, the hinging lines of said link members extending transversely of the axis of rotation of said intermediate member, each of said link members being doubled on itself.

5. A coupling comprising three spaced rotatable members, the outer two of which form driving and driven members and the third of which forms an intermediate member, and two pairs of resilient plates extending approximately parallel to the axis of rotation of said intermediate member and having their planes disposed approximately tangentially, each pair of plates being arranged on opposite sides of the axis of rotation of said intermediate member and approximately at right angles to the other pair and being secured to said intermediate member, said two pairs of plates being secured to said driving and driven members respectively at points axially spaced from the points of securement to said intermediate member.

6. A coupling comprising a pair of rotatable driving and driven hubs each having a pair of diametrically opposite projections, the pair of projections on one hub being displaced 90° about the axis of rotation from the pair of projections on the other hub, a rotatable intermediate member, and link plates having their planes spaced from and extending approximately parallel to the axis of rotation and connecting the projections of said hubs with said intermediate member.

7. A coupling comprising a pair of rotatable driving and driven hubs each having a pair of diametrically opposite projections, the pair of projections on one hub being displaced 90° about the axis of rotation from the pair of projections on the other hub, a rotatable intermediate member, and spring plates having their planes spaced from and extending approximately parallel to the axis of rotation and connecting the projections of said hubs with said intermediate member.

8. A coupling comprising rotatable driving and driven members, and means for drivingly connecting said members including spring plates having their planes spaced from and extending approximately parallel to the axis of rotation of said members, each plate being doubled on itself to increase its effective spring length.

9. In a coupling, the combination of rotatable driving and driven members and a rotatable intermediate member, and two pairs of link members connected to said driving and driven members respectively to form two parallelogram linkages therewith, said linkages having their planes of action arranged radially of said intermediate member and extending at right angles to each other.

10. In a coupling, the combination, with rotatable members, of resilient link plates connecting said members, each plate being apertured to form spaced side portions and an intervening spring tongue, said tongue being secured to one of said rotatable members.

ROYAL LEE.